UNITED STATES PATENT OFFICE.

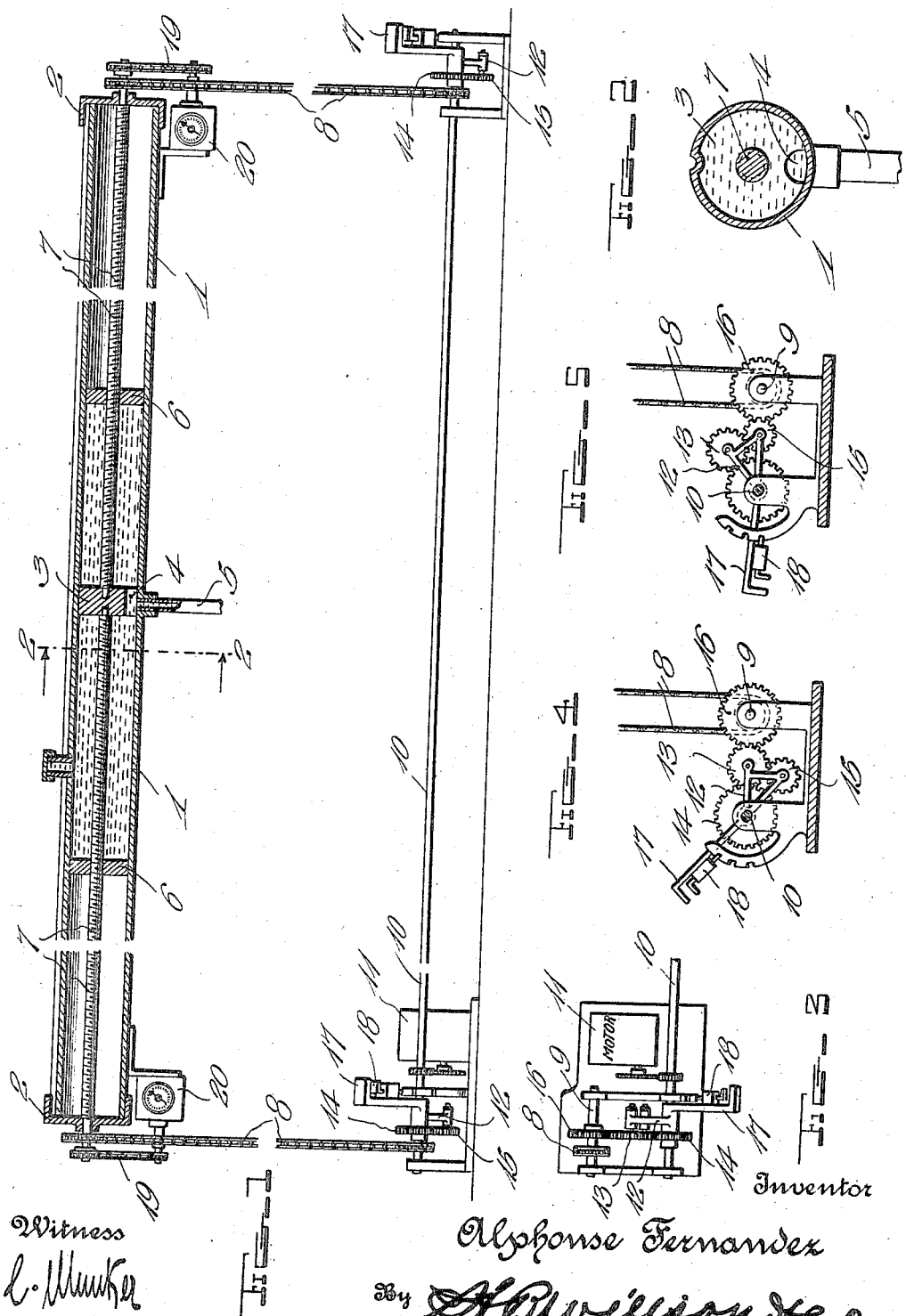

ALPHONSE FERNANDEZ, OF WASHINGTON, DISTRICT OF COLUMBIA.

FUEL-TANK.

1,237,891. Specification of Letters Patent. Patented Aug. 21, 1917.

Application filed October 14, 1916. Serial No. 125,604.

*To all whom it may concern:*

Be it known that I, ALPHONSE FERNANDEZ, a subject of the King of Spain, residing at Washington, in the District of Columbia, have invented certain new and useful Improvements in Fuel-Tanks; and I do declare the following to be a full, clear, and exact description of the invention, such as will enable others skilled in the art to which it appertains to make and use the same.

The present invention has for its principal object to provide an improved type of fuel tank for aeroplanes and other types of air craft, provision being made whereby the fuel is prevented from splashing and whereby said fuel may be shifted at will to serve to some extent as balancing means.

With the foregoing general object in view, the invention resides in certain novel features of construction and in unique combinations of parts to be hereinafter fully described and claimed, the descriptive matter being supplemented by the accompanying drawing which constitutes a part of this application and in which:

Figure 1 is a longitudinal section of the improved tank and an elevation of the means for adjusting the two pistons or followers;

Fig. 2 is a transverse section on the plane of the line 2—2 of Fig. 1;

Fig. 3 is a top plan view of one of the reverse gears employed in driving the worms for adjusting the pistons;

Figs. 4 and 5 are end elevations of the reverse gear shown in Fig. 3, illustrating the two operative positions thereof.

In the accompanying drawing above briefly described 1 has reference to an elongated tank preferably of cylindrical formation, the ends of said tank being closed by caps 2 while the center thereof is preferably provided with a partition 3 having a passage 4 by means of which the two halves of the tank are placed in communication, an outlet 5 being provided adjacent said passage.

A pair of followers or pistons 6 are mounted for movement between the ends and the center of the tank 1 and for operating said pistons a pair of oppositely pitched screws 7 are provided, the inner ends of said screws being journaled in the partition 3 while the outer ends thereof are similarly mounted in suitable bearings formed at the centers of the caps 2.

The screws 7 are driven independently or simultaneously in either direction by sprocket chains or the like 8 to which movement is imparted by horizontal shafts 9 mounted in suitable bearings at any preferred location. Both shafts 9 are driven from a common drive shaft 10 by means of reverse gears so that the direction of rotation of the screws 7 may be under control, shaft 10 being provided with any suitable driving means such as the motor 11 shown in Figs. 1 and 3.

Each of the reverse gears above referred to comprises a suitably shaped frame 12 mounted on the shaft 10 for swinging around the latter as a pivot, said frame having a spur gear 13 meshing with a similar gear 14 keyed on said shaft 10. The frame 12 also carries another gear 15 which is in mesh with 13 but out of mesh with 14. By swinging frame 12 to one position (Fig. 4) gear 13 will transmit motion from 14 to another gear 16 on the shaft 9 but when said frame is shifted to its other operative position, 13 will be moved out of mesh with gear 16 and 15 will mesh therewith as depicted in Fig. 5. This changes the direction of rotation of the shaft 9 and it will thus be clear that the pistons 6 may be moved in either required direction.

For the purpose of shifting the frames 12 to either operative position or to an intermediate neutral position, levers 17 are secured thereto and are provided with suitable locking devices 18 for holding them in adjusted position.

By the provision of any suitable driving connections such as the sprocket chains 19 of Fig. 1, the screws 7 drive independent indicators 20 by whose use the location of the pistons 6 may be ascertained, said indicators also showing the amount of fuel in the tank between the pistons.

The device, as above suggested, is intended primarily for use on airships and it may well be employed for the purpose of carrying other liquids than engine fuel. Regardless of the liquid carried, it will be prevented from splashing and disturbing the equilibrium of the ship by the pistons 6 and for purposes of balancing the craft, the body of liquid may be shifted toward either end or to the center of the tank by properly driving the screws 7. On account of these advantages, the construction shown and described constitutes the preferred form of the device but it is to be understood that within the scope of the invention as claimed, numerous changes may be made without sacrificing the principal advantages. Also, although the device has been described for use on airships, it will be obvious that it may well be employed for other purposes if desirable.

I claim:

1. A liquid carrier comprising an elongated tank having at its center an outlet, a pair of pistons in said tank movable between the ends and the outlet thereof, and means connected to said pistons for moving them in unison toward either end of the tank or for moving them reversely.

2. A liquid carrier comprising an elongated tank having at its center an outlet, a pair of pistons in said tank movable between the ends and the outlet thereof, a pair of screws for moving the two pistons, and means for driving said screws in unison in the same direction, or reversely.

3. A liquid carrier comprising an elongated tank having at its center an outlet, a pair of pistons in said tank movable between the ends and the outlet thereof, a pair of screws for moving the two pistons, a common drive shaft, and independent driving connections between said shaft and the screws, the driving connections for each screw including a reverse gear.

In testimony whereof I have hereunto set my hand in the presence of two subscribing witnesses.

ALPHONSE FERNANDEZ.

Witnesses:
J. A. GRIESBAUER,
T. A. NOONE.

Copies of this patent may be obtained for five cents each, by addressing the "Commissioner of Patents, Washington, D. C."